United States Patent [19]
Nachenberg

[11] Patent Number: 5,826,013
[45] Date of Patent: Oct. 20, 1998

[54] POLYMORPHIC VIRUS DETECTION MODULE

[75] Inventor: Carey S. Nachenberg, Northridge, Calif.

[73] Assignee: Symantec Corporation, Cupertino, Calif.

[21] Appl. No.: 780,985

[22] Filed: Jan. 8, 1997

Related U.S. Application Data

[63] Continuation-in-part of Ser. No. 535,340, Sep. 28, 1995, Pat. No. 5,696,822.

[51] Int. Cl.$^6$ .............................. H04L 9/00; G06F 3/00; H04K 3/00
[52] U.S. Cl. .............. 395/186; 395/183.09; 395/183.14; 380/4; 380/25
[58] Field of Search ............................. 395/186, 183.14, 395/183.09, 183.01; 380/4, 25

[56] References Cited

U.S. PATENT DOCUMENTS

| | | | |
|---|---|---|---|
| 4,975,950 | 12/1990 | Lentz | 380/4 |
| 5,121,345 | 6/1992 | Lentz | 364/550 |
| 5,144,660 | 9/1992 | Rose | 380/4 |
| 5,319,776 | 6/1994 | Hile et al. | 395/186 |
| 5,321,840 | 6/1994 | Ahlin et al. | 395/712 |
| 5,349,655 | 9/1994 | Mann | 395/182.04 |
| 5,359,659 | 10/1994 | Rosenthal | 380/4 |
| 5,398,196 | 3/1995 | Chambers | 364/580 |
| 5,408,642 | 4/1995 | Mann | 395/183.14 |
| 5,421,006 | 5/1995 | Jablon et al. | 395/183.12 |
| 5,440,723 | 8/1995 | Arnold et al. | 395/181 |
| 5,442,699 | 8/1995 | Arnold et al. | 380/4 |
| 5,485,575 | 1/1996 | Chess et al. | 395/183.14 |
| 5,511,163 | 4/1996 | Lerch et al. | 395/183.14 |
| 5,537,540 | 7/1996 | Miller et al. | 395/183.14 |
| 5,559,960 | 9/1996 | Lettvin | 395/186 |
| 5,613,002 | 3/1997 | Kephart et al. | 380/4 |
| 5,649,095 | 7/1997 | Cozza | 395/183.15 |
| 5,675,711 | 10/1997 | Kephart et al. | 395/183.15 |
| 5,684,875 | 11/1997 | Allenberger | 482/4 |

FOREIGN PATENT DOCUMENTS

0636977 A2  2/1995  European Pat. Off. ........ G06F 11/00

OTHER PUBLICATIONS

Gotlieb, L., "End Users and Responsible Computing", *CMA—the Management Accounting Magazine*, vol. 67, No. 7, Sep. 1993, p. 13.

Karney, J., "Changing the Rules on Viruses", *PC Magazine*, vol. 13, No. 14, Aug. 1994, p. NE36.

Schnaidt, P., "Security", *LAN Magazine*, vol. 7, No. 3, Mar. 1992, p. 19.

"UK–Sophos Intros Unix Virus Detection Software Jan. 26, 1995", *Newsbytes News Network,* Jan. 26, 1995.

"Anti–virus Company Claims Polymorphic Breakthrough Jul. 10, 1992", *Newsbyte News Network,* Jul. 10, 1992.

(List continued on next page.)

*Primary Examiner*—Robert W. Beausoliel, Jr.
*Assistant Examiner*—Ly V. Hua
*Attorney, Agent, or Firm*—Fenwick & West LLP

[57] ABSTRACT

A Polymorphic Anti-virus Module (PAM) (200) comprises a CPU emulator (210) for emulating the target program, a virus signature scanning module (250) for scanning decrypted virus code, and an emulation control module (220), including a static exclusion module (230), a dynamic exclusion module (240), instruction/interrupt usage profiles (224) for the mutation engines (162) of the known polymorphic viruses (150), size and target file types (226) for these viruses, and a table (228) having an entry for each known polymorphic virus (150). During emulation, the emulation control module (220) may observe use of a register-indirect memory write instruction using a register that has not been initialized. Such a random write can be used as an indication that the file is probably a data file and so is unlikely to harbor a virus.

7 Claims, 5 Drawing Sheets

OTHER PUBLICATIONS

"LAN Buyers Guide: Network Management", *LAN Magazine,* vol. 7, No. 8, Aug. 1992, p. 188.

Veldman, Frans, "Virus Writing Is High–Tech Infosecurity Warfare", *Security on the I–Way '95,* 1995, pp. L–1—L–16, U.S.A.

Symantec Corporation, "Norton AntiVirus for Windows 95 & Special Subscription Offer", 1995, U.S.A.

ThunderBYTE B.V., "User Manual", 1995, pp. i–191, Wijchen, The Netherlands.

"Virus Infection Techniques: Part 3", *Virus Bulletin,* 1995, pp. 006–007, Oxfordshire, England.

Cohen, Frederick B., "A Short Course on Computer Viruses—2d Ed.", John Wiley & Sons, Inc., pp. 54–55, 199–209, 1994, U.S.A.

Veldman, Frans, "Heuristic Anti–Virus Technology", Proceedings of the International Virus Protection and Information Security Conference, Apr. 1, 1994.

Wells, Joseph, "Viruses in the Wild", Proceedings of the International Virus Protection and Information Security Conference, Apr. 1, 1994.

Gordon, Scott, "Viruses & Netware", Proceedings of the International Virus Protection and Information Security Conference, Mar. 31, 1994.

Solomon, Alan, "Viruses & Polymorphism", Proceedings of the International Virus Protection and Information Security Conference, Mar. 31, 1994.

Case, Tori, "Viruses: An Executive Brief", Proceedings of the International Virus Protection and Information Security Conference, Mar. 31, 1994.

Skulason, Fridrik, "For Programmers", *Virus Bulletin,* Jul. 1990, pp. 10–11, Oxon, England.

Digitext, "Dr. Solomon's Anti–Virus Toolkit for Windows and DOS", *S&S International PLC,* Jan. 1995, pp. 1–15, 47–65, 75–77, 91–95, 113–115, and 123–142, United Kingdom.

"Automated Program Analysis for Computer Virus Detection", *IBM Technical Disclosure Bulletin,* vol. 34, No. 2, Jul. 1991, pp. 415–416.

"Artificial Immunity for Personal Computers", *IBM Technical Disclosure Bulletin,* vol. 34, No. 2, Jul. 1991, pp. 150–154.

Marshall, G., "Pest Control", *LAN Magazine,* Jun. 1995, pp. 55–67.

POLYMORPHIC VIRUS DETECTION MODULE

CROSS-REFERENCES TO RELATED APPLICATION

This patent application is a continuation-in-part of U.S. patent application Ser. No. 08/535,340, entitled "Polymorphic Virus Detection Module" filed Sep. 28, 1995 by Carey S. Nachenberg, now U.S. Pat. No. 5,696,822.

BACKGROUND OF THE INVENTION

1. Technical Field

This invention relates to the field of computer viruses, and in particular to methods and systems for detecting polymorphic viruses.

2. Background Art

Polymorphic viruses are a type of computer virus designed to evade detection by infecting each new file with a mutated version of the virus. By providing each newly infected file with viral code having a different appearance, polymorphic viruses frustrate most standard virus-detection schemes, which rely on some type of string scanning to identify computer viruses in a file.

Polymorphic viruses comprise a static virus body and a mutation engine. In the most common polymorphic viruses, the virus does not mutate. Rather, the mutation engine generates a virus decryption routine (polymorphic decryption loop) and uses the dual of this routine to encrypt the static virus body and the mutation engine. The new decryption routine and the newly encrypted virus body are then inserted into the host file. Common mutation strategies employed by the mutation engine include reordering of instructions, substituting equivalent instructions or equivalent sequences of instructions, inserting random "garbage" instructions (which have no effect on the virus functionality), interchanging function calls, in-line code, JMP instructions, and the like, and using equivalent registers interchangeably.

Thus far, the most successful technique for detecting polymorphic viruses has been cue-directed program emulation (CDPE). CDPE methods assumes that the polymorphic code contains at least one section of machine code, the static viral body, that is consistent from generation to generation. CDPE methods also assume that when executed the decryption routine of the polymorphic virus deterministically decrypts the encrypted static virus body and transfers control to the static virus body when decryption is complete. The strategy employed by CDPE methods is to emulate the polymorphic virus until it has decrypted itself and then analyze the decrypted virus body using standard scanning techniques.

CDPE virus detection systems comprise a scanner module, a CPU emulator (80×86), a set of virus signatures, and an emulation control module. The scanner module locates a file's entry point and the CPU emulator performs a limited emulation of the file's machine code under control of the emulation control module. Emulation proceeds until the emulation control module believes either that the virus is fully decrypted or that the file is not infected with a virus, at which point string scanning for virus signatures commences.

The CDPE emulation control module examines each emulated instruction with the aid of certain heuristics to determine whether the instructions being emulated are likely to be part of a polymorphic decryption loop or a normal program. For example, certain sequences of instructions are frequently found in polymorphic decryption loops. These instruction sequences are referred to as "boosters" since they indicate to the emulation control module that it is seeing a potential decryption loop and should continue emulating instructions. Other sequences of instructions are rarely found in decryption loops. These instruction sequences are referred to as "stoppers" since they indicate to the emulation control module that the instructions are probably not from a virus decryption loop. Stoppers may be present if the host file is not infected or if the emulation has fully decrypted the static virus body. In the latter case, the static virus body, like any other program, may use any instructions supported by the processor architecture. In addition, stoppers may be present if a virus designer has included them in a decryption loop to foil CDPE detection methods.

CDPE based methods employ additional heuristics to determine what the detection of various stoppers and boosters indicates about the code being emulated. For example, if a number of stoppers have been found prior to the detection of any boosters, the emulation control module will likely decide that the host file is uninfected. On the other hand, if one or more stoppers are detected following detection of a number of boosters, the emulation control module will likely decide that the polymorphic loop has been fully decrypted to reveal the static virus body. In this case, virus scanning will proceed.

The selection of boosters and stoppers included in the emulation control module can have a substantial impact on the speed and accuracy with which the CDPE system detects viruses. Ideally, stoppers and boosters are selected to work accurately for all known polymorphic viruses. However, it may not be possible to find a set of such heuristics that does not significantly slow virus scanning. Stoppers and boosters useful for detecting several polymorphic viruses may actually prevent the detection of other polymorphic viruses, as for example, where a virus writer includes a standard stopper in polymorphic loop code to confuse CDPE modules. In general, any change in the stoppers or boosters used must be accompanied by extensive regression testing to insure that previously detected viruses are not missed using the new heuristics. Since new polymorphic viruses are continually being developed, the time consuming and awkward selection and regression testing of new combinations of stoppers and boosters can not be avoided.

Thus, there is a need for polymorphic virus detection systems that can be readily expanded to cover newly discovered viruses, without need for extensive regression testing and modification of the heuristics of the emulation control module. In addition, the system should be able to provide accurate results without emulating unnecessarily large numbers of instructions.

Many users of antivirus software scan every file, even data files, that are accessed by the users to detect viruses. Because data files can not harbor polymorphic viruses since they are not executable, polymorphic virus detection systems unnecessarily spend time checking such data files for viruses. To test the data file, the polymorphic virus detection system reads and emulates the data file as a sequence of instructions as if it is a standard executable program. When emulated as if it is a program, the set of data is sometimes coincident with instructions that look like a virus decryption routine. The polymorphic virus detection system must then analyze and emulate these instructions assuming it is a virus until the system determines that the data file is not a virus. Again, the polymorphic virus detection system unnecessarily spends time performing this analysis. Thus, there is a need for polymorphic virus detection systems to quickly determine whether a file is an executable or a data file.

SUMMARY OF THE INVENTION

The present invention is a polymorphic anti-virus module or PAM (200) for detecting polymorphic viruses (150) using mutation-engine specific information for each known polymorphic virus rather than heuristic stopper and booster code sequences. The PAM system (200) comprises a CPU emulator (210) for emulating the target program, a virus signature scanning module (250) for scanning decrypted virus code, and an emulation control module (220), including a static exclusion module (230) and a dynamic exclusion module (240), for determining how long each target file is emulated before it is scanned. The emulation control module (220) also includes data (222) specific to each known polymorphic virus (150) and organized in a format that facilitates comparison with target files being tested for infection. This data (222) includes instruction/interrupt usage profiles (224) for the mutation engines (162) of the known polymorphic viruses (150), as well as size and target file types (226) for these viruses. The emulation control module (220) also includes a table (228) having an entry for each known polymorphic virus (150) which can be flagged when characteristics inconsistent with the polymorphic virus are detected.

In accordance with the present invention, the static exclusion module (230) examines the gross characteristics of the target file for attributes that are inconsistent with the mutation engine specific data for known polymorphic viruses (150). These characteristics are the type of target file, the size of the target file's load image, the presence of certain instructions at the file entry point, and the distance between the file entry point and the end of the load image. The last characteristic is useful because most viruses append themselves to the files they infect. In some cases, the static exclusion module (230) allows certain target files to be identified as infected without any emulation.

The dynamic exclusion module (240) examines the instruction/interrupt usage profiles (224) of each known polymorphic virus (150) as each instruction is fetched for emulation. The instruction/interrupt usage profiles (224) indicate which polymorphic viruses (150) employ mutation engines that do not use the fetched instruction in decryption loops they generate, and the emulation control module (220) flags these viruses. The emulation control module (220) continues until all mutation engines have been flagged or until a threshold number of instructions have been emulated. The flagging technique implemented by the dynamic exclusion module (240) determines when emulation has proceeded to a point where at least some code from the decrypted static virus body (160) may be scanned and substantially reduces the number of instructions emulated prior to scanning the remaining target files without resort to booster or stopper heuristics.

Register-indirect memory write instructions write data to a memory address specified by a pointer register. For 80×86 microprocessors, the pointer register is typically the index (SI or ESI) register, in which case the instruction is called an indexed memory write instruction. The pointer register may also be a base register.

During emulation, the emulation control module (220) may observe use of an indexed memory write instruction via an index register that has not been initialized (modified prior to the indexed memory write). Such an uninitialized indexed memory write is called a "random write" and is unlikely to occur in an executable program file because the memory address being written would be unknown. Therefore, such an uninitialized indexed memory write is an indication that the file is probably a data file, rather than an executable file, and so is unlikely to harbor a virus.

The reason for this is that if a program randomly writes to a memory location, the program (or virus) may overwrite itself or other important data. Upon observing such a random write, the emulation control module (220) delists each polymorphic virus that requires an instruction to initialize or modify an index register before a subsequent memory write using that index register. If the index register has been initialized or modified before the execution of the current fetched indexed memory write instruction in the file being scanned, the likelihood is that the instruction is a valid instruction and probably does not correspond to data in a data file.

It is noted that some viruses do not write with initialized index registers but knows the state of the register because the operating system may guarantee the state. One such virus is the PC Weevil virus that uses an indexed memory write instruction to add zero to some locations which does not alter the value stored in these locations. The emulation control module (220) continues analyzing the program for these viruses and other viruses that remain listed.

It is not always necessary to fully decrypt the static virus body (160) to identify the underlying virus. In the preferred embodiment of the invention, the emulation control module (220) tracks those parts of virtual memory modified during emulation and periodically interrupts the emulation process to call the scanning module (250). The scanning module (250) tries to identify the virus type from the portion of decrypted static virus code (160). In order to speed up the process, the scanning module (250) implements a coarse scan of tagged memory locations to identify data bytes most likely to be associated with decrypted static virus code (virus signatures). It implements a more detailed binary search process only when selected bytes are encountered during the coarse scan. This approach greatly speeds up scanning without decreasing the accuracy of the scanning module (250). When code matching one of the viral signatures is identified, the PAM system (200) signals to the host computer that an infected file has been located.

DETAILED DESCRIPTION OF THE PREFERRED EMBODIMENTS

Computer viruses infect a variety of files in a number of different ways. In the DOS environment, computer viruses have been used to infect three different types of executable files: COM files, SYS files, and EXE files. A common feature of these files is that at some point after loading, control of the computer is passed to the program code stored in the file. Computer viruses infect these executable files by attaching themselves to the file and modifying the machine language at the file entry point to transfer control to the virus rather than to the executable file. In order to camouflage their presence, computer viruses typically return control to the infected executable file once they have run.

Figure 1A:
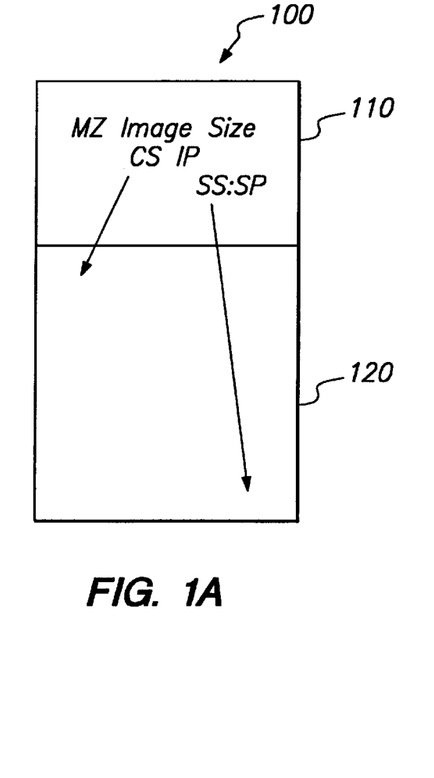
FIGS. 1A–1C are schematic representations of the load images of an uninfected computer file, a file infected by a virus, and a file infected by a polymorphic virus, respectively.
Figure 1B:
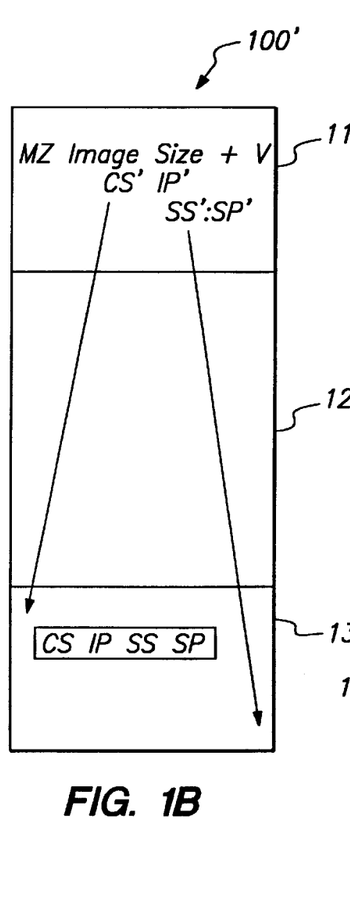

Referring to FIGS. 1A and 1B, there are shown executable images 100, 100' of an EXE file before and after infection, respectively, by a virus 130. Infection modes for EXE, COM, and SYS files are discussed in greater detail in Nachenberg, *A New Technique For Detecting Polymorphic Computer Viruses*, Master Thesis, University of California at Los Angeles (1995), which is hereby incorporated by reference. Executable image 100 comprises a header 110 and program code 120. Header 110 includes a signature (MZ), size field, a code segment field CS, an instruction pointer field IP, a stack segment field SS, and a stack pointer field SP. MZ indicates the file type (EXE in this case) and the following field specifies the size of executable image 100. CS and IP specify an entry point 122 of program code 120, and SS and SP point to the end of program code 120, where a stack (not shown) may be generated.

Upon infection by computer virus 130, header 110' of executable image 100' is modified so that size field equals the size of executable image 100 incremented by the size of computer virus 130. In addition, computer virus 130 has replaced CS, IP of image 100 with CS', IP' in image 100'. CS', IP' point to an entry point 132 of virus 130 rather than entry point 122 of program code 120. Similarly, computer virus 130 has replaced SS, SP of image 100 with SS', SP' in image 100', which point to the end of virus 130. In order to return control of the computer to program code 120 following execution of virus 130, CS, IP, SS, and SP of uninfected image 100 are retained by virus 130.

Computer viruses 130 which are added to EXE, COM, or SYS files in the manner of FIG. 1B are relatively easy to detect. A virus detection program need only scan executable image 100' for code segments associated with known viruses 130. These code segments, known as virus signatures, are code segments unique to different viruses, and their presence in an executable image 100' is taken as a clear indication that the corresponding file has been infected. A number of methods are available for scanning executable images 100' for virus signatures. Different viruses 130 may implement a number of strategies to hide their presence in an executable image 100'.

One of the most successful strategies is that implemented by polymorphic viruses, which include a mutation engine that encrypts a static virus body according to a different (mutated) encryption key with each new infection. The encrypted virus is appended to the image with a mutated decryption routine, which decrypts the encrypted virus to reveal the static virus body only when the file is executed. The new appearance presented by such polymorphic viruses on each infection frustrate those detection methods which would simply scan images 100' for viral signatures.

Figure 1C:
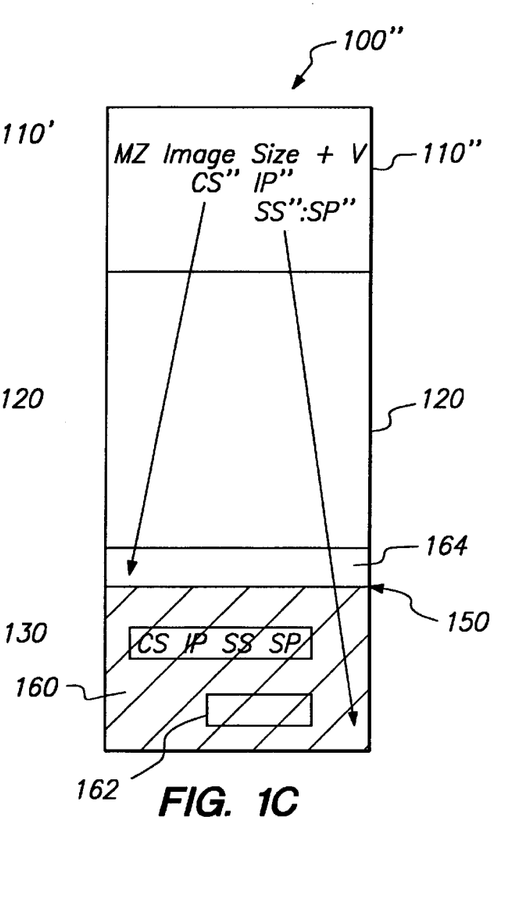

Referring now to FIG. 1C, there is shown an executable image 100" infected by a polymorphic virus 150. Polymorphic virus 150 comprises a static virus body 160 including a mutation engine 162, both of which are shown hatched in the FIG. 1C to indicate their encrypted state. On infection, mutation engine 162 generates a variable encryption routine (not shown) that encrypts static virus body 160 (including mutation engine 162) to prevent detection of polymorphic virus 150 by conventional scanning techniques. A decryption routine 164, which is the dual of the encryption routine, is prepended to encrypted static virus body 160. When image 100" is executed, a decryption routine 164 decrypts and passes control to static virus body 160, which employs the CPU of the host computer to attach itself to other files and implement whatever mischief its designer intends.

One anti-virus detection scheme designed specifically for polymorphic viruses 150 is Cue Directed Program Emulation (CDPE). CDPE operates by emulating a target image 100" or file for a sufficient number of instructions to allow a polymorphic virus 150 present in image 100" to decrypt itself and reveal its static virus body 160. Static virus body 160 is then scanned to identify the type of virus present and steps are taken to deactivate it. As noted above, CDPE methods rely on the detection of prescribed stopper and booster code segments as a target file is emulated in order to determine whether an encrypted static virus body 160' is present, and if so, to determine whether it has been at least partially decrypted. The problem with this approach is that stopper and booster segments must be selected carefully and thoroughly tested in order to detect viruses accurately and completely. Stoppers and boosters added to detect new viruses require thorough regression testing to insure that they do not interfere with the detection of other polymorphic viruses. In short, stoppers and boosters that will work effectively with all polymorphic viruses must be identified, even as virus designers use these same stopper and booster heuristics to better camouflage their creations.

In addition to the problems posed by any changes in the stopper, booster heuristics, CDPE emulation is done by virtual machines in order to isolate potentially infected files from the actual CPU and memory of the host computer. These virtual machines tend to operate slowly relative to the actual CPUs, and since each file must be checked, virus checking can be a very time consuming process. The speed of these programs is slowed further as more complicated heuristics are developed to detect polymorphic viruses.

Figure 2:
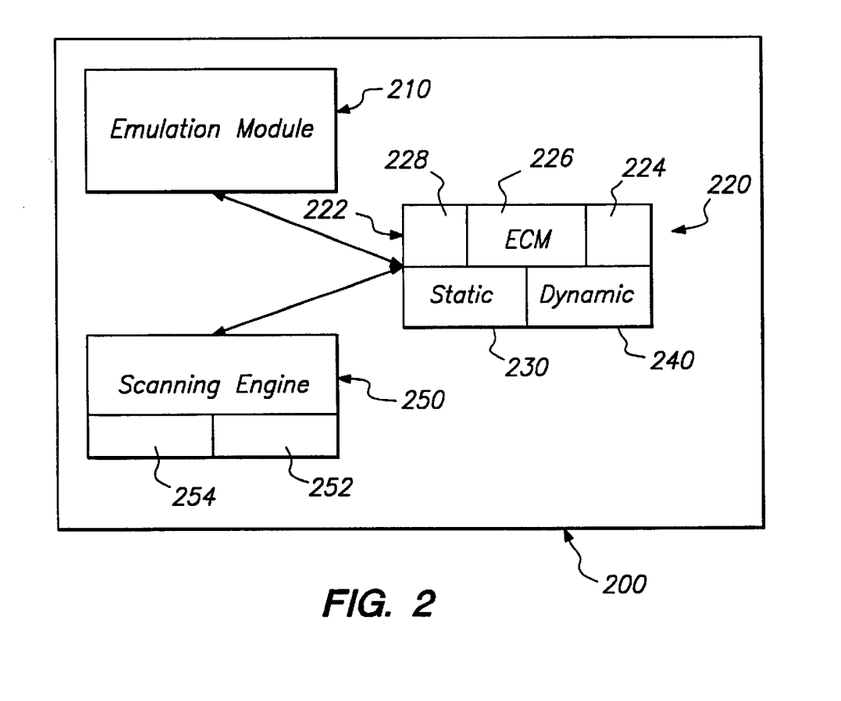
FIG. 2 is a block diagram of a Polymorphic Anti-virus Module (PAM) in accordance with the present invention.

Referring now to FIG. 2, there is shown a block diagram of a polymorphic anti-virus module (PAM) 200 in accordance with the present invention. PAM 200 comprises an emulation module 210, an emulation control module 220, and a scanning module 250. As in CDPE systems, emulation module 210 allows PAM 200 to emulate a target file without allowing the target file to interact with either the actual CPU or memory of the host computer. Scanning module 250 includes virus signatures 252 for identifying polymorphic viruses 150 and a scanning engine 254 for efficiently searching decrypted virus code for these signatures. The scanning engine 254 is discussed in greater detail below in conjunction with FIG. 4B.

Emulation control module 220 comprises virus profile data 222, a static exclusion module 230, and a dynamic exclusion module 240, which combine to substantially reduce the number of file instructions that must be emulated in order to determine whether a target file is infected by a virus. Virus profile data 222 comprises an instruction/interrupt usage profile 224 for each known polymorphic virus 150 as well as data on the sizes of known polymorphic viruses 150 and type of target files infected by each (size/type data 226). Size/Type data 226 is accessed by static exclusion module 230 prior to emulation to eliminate certain polymorphic viruses 150 from consideration, and instruction/interrupt usage profiles 224 are accessed by dynamic exclusion module 240 during emulation to determine whether the emulated code may be part of a virus decryption loop. Emulation control module 220 also includes a table 228 of all known polymorphic viruses 150 which is initialized with all viruses 150 flagged. As each virus 150 is eliminated from consideration by static or dynamic exclusion modules 230, 240, respectively, the corresponding flags are reset to preclude further consideration of the virus.

For example, gross features of executable image 100 that are inconsistent with various polymorphic viruses 150 allow the static exclusion module 230 to rule out infection of a target file 100 by these polymorphic viruses before any emulation is done. If features inconsistent with a polymorphic virus 150 are detected in target file 100, the associated flag in table 228 is reset and it is excluded from further consideration during the subsequent emulation phase. If the gross features of target file 100 are inconsistent with infection by all known polymorphic virus 150, no emulation is required to determine that target file 100 is uninfected, and the next target file may be considered. More often, analysis by static exclusion module 230 allows only some of polymorphic viruses 150 to be excluded from further consideration.

Data on polymorphic viruses 150 considered by static exclusion module 230 are: (1) the type of target file each known polymorphic virus 150 is designed to attack; (2) the minimum size of the load image of each polymorphic virus 150; (3) whether a polymorphic virus 150 uses a JMP instruction as the first instruction of in target COM file; and (4) the maximum size of the load image of each polymorphic virus 150. In order to take advantage of this data, static exclusion module 230 determines: the target file type and load image size for a target file being analyzed. In addition, if a COM target file is being analyzed, static exclusion module 230 determines its first instruction, and if an EXE target file is being analyzed, static exclusion module 230 determines the distance between the entry point and end of the load image. Theses gross characteristics and their relationship to features of known polymorphic viruses 150 are considered below.

Type of Executable File Targeted

Different viruses infect different executable file formats. Some infect only COM files, some infect only EXE files, and some infect both COM and EXE files. Very few viruses infect SYS files but some of these can infect EXE or COM files as well. Consequently, if target file is an EXE file, all polymorphic viruses 150 that attack only COM files or SYS files may be excluded from further consideration in the analysis of target file 100. In this case, flags are reset in table 228 for each of polymorphic viruses 150 excluded by the type of target file 100, and subsequent analysis of target file 100 considers only unexcluded polymorphic viruses 150.

Minimum Size of Polymorphic Virus

Depending on the encryption routine employed, polymorphic viruses 150 may generate executable images having a range of sizes. However, a minimum size for the executable image of each polymorphic virus 150 is provided by unencrypted static virus body 160, including mutation engine 162. Consequently, each polymorphic virus 150 having an executable image that is larger than the executable image 100 of the target file being analyzed may be excluded from further consideration in that analysis.

JMP Instruction Usage

Many polymorphic viruses 150 that infect COM files do so by appending themselves to the COM file and inserting a JMP instruction at the entry point of the COM file. Consequently, when static exclusion module 230 examines a COM file and determines that the first instruction is not a JMP instruction, each polymorphic virus 150 that employs such an instruction at the entry point of infected COM files may be excluded from further consideration.

Entry Point Distance in EXE Files

Polymorphic viruses 150 that infect EXE files have a maximum load image size. Since these viruses infect EXE files by appending themselves to the EXE file load image, the distance between entry point 132 and the end of the load image must be less than this maximum value. Any polymorphic viruses 150 having maximum sizes less than the distance calculated for an EXE file under analysis may be excluded from further consideration.

This list of features examined during the static exclusion phase is not intended to be exhaustive. Additional features of polymorphic viruses 150 may also be suitable for use by static exclusion module 230 to exclude various polymorphic viruses 150 from further consideration.

Typically, only a subset of known polymorphic viruses will be ruled out by static exclusion module 230 and some emulation will be required. In these cases, dynamic exclusion module 240 is implemented to initiate and control emulation module 210. During emulation, emulation control module 220 instructs emulation module 210 to fetch an instruction from load image 100. As each instruction is fetched, emulation control module 220 compares the fetched instructions with an instruction/interrupt usage profile 224 for each known polymorphic virus 150. For each polymorphic virus 150 that does not implement the fetched instruction as indicated by its instruction/interrupt usage profile 224, the corresponding flag in table 228 is reset to exclude the polymorphic virus from further consideration. This process continues with each succeeding instruction until all polymorphic viruses 150 have been excluded. Alternatively, the emulation phase for a target file may be stopped or suspended when one of two other conditions occurs. These conditions are discussed in greater detail below, in conjunction with FIG. 4A.

Figure 3:
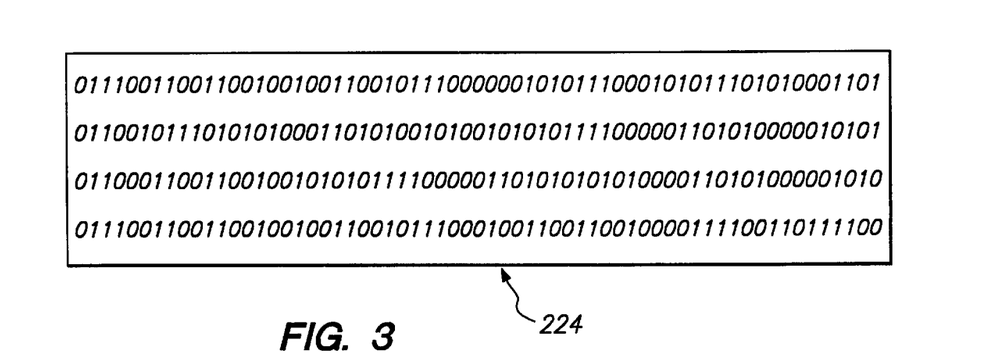
FIG. 3 is an example of an instruction/interrupt usage profile employed in the emulation control module (220) of the present invention.

Referring now to FIG. 3, there is shown an example of an instruction/interrupt usage profile 224 employed by emulation control module 220 to detect a corresponding polymorphic virus 150. Instruction/interrupt usage profiles 224 are made possible by the fact that mutation engines 162 of known polymorphic viruses 150 do not use the entire instruction set available for various processor architectures. For example, the 80×86 instruction set allows for variable length instructions. However, in most cases the first byte of each instruction determines its basic functionality, providing 256 possible basic instruction types. Mutation engines 162 typically employ substantially fewer than 256 instruction types of the 80×86 instruction set.

Referring still to FIG. 3, each bit of instruction/interrupt usage profile 224 corresponds to a different possible instruction type supported by the 80×86 architecture. A 1 indicates that mutation engine 152 of polymorphic virus 150 uses the corresponding instruction in its decryptors, and a 0 indicates that the instruction is not used by mutation engine 152. For example, the mutation engine employed by the Everfire polymorphic virus uses eight different instruction types in its decryptors, while the DSCE mutation engines uses 190 different instruction types in its decryptors. Consequently, instruction usage profile 224 for the Everfire polymorphic virus includes only eight ones in the bits corresponding to these instructions. On the other hand, 190 of 256 bits of instruction usage profile 224 fro the DSCE polymorphic virus are ones, making this virus more difficult to detect.

The instructions/interrupts used by the mutation engine of a polymorphic virus may be determined by infecting a large number of files with the polymorphic virus and analyzing the decryption loops generated in the infected files. Virus infection may be done automatically under software control, and the resulting polymorphic decryption loops may likewise be analyzed automatically to generate instruction/interrupt usage profile 224 appropriate for the virus' mutation engine. Further, since each polymorphic virus 150 is tested with data specific to its mutation engine 162, there is no need for regression testing when a new instruction/interrupt usage profile is added to emulation control module 220.

Polymorphic viruses 150 typically have no reason to use interrupts in their decryption loops, and consequently, these were used as "stoppers" by CDPE anti-virus program developers. Not surprisingly, virus developers began to include interrupts in their decryption loops specifically because conventional CDPE programs would interpret their presence as an indication that the associated code was not part of a decryption loop. In the present invention, emulation control module 220 treats detection of an interrupt in a manner similar to detection of any instruction, to eliminate from further consideration each polymorphic virus 150 that does not employ such an interrupt in its decryption loop.

Emulation control module 220 compares the instructions/interrupts fetched by emulator module 210 with the corresponding entry in instruction/interrupt usage profile 224 of each polymorphic virus 150 still under active consideration. When emulator 210 fetches an instruction (or an interrupts) that is not employed by one of polymorphic viruses 150 still being considered, the corresponding flag in table 228 is reset indicating that the virus should no longer be considered in the emulation phase of PAM 200.

Typically, Emulation module 210 eventually retrieves an instruction that is not implemented by the last actively considered polymorphic virus 150. This indicates either that (1) target file 100 in not infected with any of polymorphic viruses 150 or (2) one of polymorphic viruses 150 has been decrypted to reveal static virus body 160, which like any program can employ any of the instructions supported by the CPU architecture. Most mutation engines 162 can be eliminated from consideration on one pass through the decryption loop of polymorphic virus 150. However, in order to eliminate the possibility of getting trapped in an infinite loop or spending too much time in the emulation phase, an upper limit may be set for the number of instructions to be emulated. In the preferred embodiment of the invention, emulation control module 220 terminates the emulation phase when either all polymorphic viruses 150 have been excluded or 1.5 million instructions have been executed.

Once the emulation phase has been terminated, scanning can begin on decrypted static virus body 160 or at least those parts decrypted by the first 1.5 million instructions. In order to facilitate scanning of static virus body 160, emulation control module 220 keeps track of which locations of virtual memory are most likely to be infected. In particular, emulation control module 220 tags the page or pages of virtual memory containing an instruction executed by emulator 210. In addition, every time an emulated instruction writes to memory, the altered pages are tagged as containing modified data. Tagged pages in virtual memory are scanned for signatures of static virus body 160 as follows:

(1) if a page contains executed code, it and the following page are scanned (2) if a page has been written to during emulation and more than a threshold number of memory writes occurred anywhere in memory during emulation, the modified page and the following page are scanned.

In the preferred embodiment of the invention, a threshold number of memory writes equal to 32 bytes has been found to speed up scanning without sacrificing accuracy. However, the 32 byte value is a heuristic and may be adjusted up or down as desired. All existing polymorphic viruses 150 modify far more than 32 bytes when they decrypt themselves. On the other hand, the number of data bytes modified by an uninfected program is typically fewer than the number modified by a polymorphic virus 150. If fewer than 32 bytes have been modified by the time the emulation phase of PAM has concluded, emulation control module 220 assumes that nothing was decrypted and does not scan modified pages.

At the completion of emulation phase, PAM 200 proceeds to a scanning phase in which all pages from which instructions were retrieved during emulation are scanned, and all pages modified during emulation are scanned provided at least 32 bytes of virtual memory have been modified during the emulation phase. During the scanning phase, virus signatures for each known polymorphic virus 150 are compared with executed and modified code in the virtual memory locations identified above. PAM 200 may employ a scanning module 250 that implements any of a number of scanning methods to search the tagged memory locations. However, in the preferred embodiment of PAM 200, scanning module 250 implements a scanning process that allows each target buffer to be scanned for signatures of all known polymorphic viruses 150 in a single pass. As used here, a target buffer corresponds to a tagged page of virtual memory.

The preferred scanning process requires that all virus signatures comply with two conditions:

(1) Virus signatures are chosen to begin with one of a selected number of special bytes.

In the preferred embodiment, sixteen special bytes are selected.

(2) Virus signatures are chosen such that emulation of corresponding polymorphic virus 150 will not modify bytes of the signature.

The first rule limits the number of valid virus signatures, but it speeds up the scanning rate of scanning module 250, which simply skips any data not beginning with the selected bytes. Scanning module 250 performs a more elaborate scan when data beginning with one of the selected bytes is encountered. In the preferred embodiment, the selected bytes are:

2E, 3D, 50, 74, 8B, 8C, B8, B9, BA, BB, BE, BF, CD, E8, E9,

These bytes are selected based on their frequent use in 80×86 machine code. The set of selected bytes is not fixed in either number or content and may be adjusted as necessary. However, use of additional selected bytes will slow the scanning phase.

For each selected byte, scanning module 250 includes a pre-computed bit array which determines whether the selected bit is part of a virus signature. When scanning module 250 encounters one of the selected bytes, the top thirteen bits of the next word provide an index into the bit array associated with the selected byte. The associated bit arrays are designed so that the indexed bit is a zero when scanning engine 250 includes no virus signature that matches the first three bytes of the target data and a one when scanning engine includes a virus signature that matches at least these three bytes. In the first case, scanning engine 250 proceeds to the next data having one of the selected bytes.

When the indexed bit is a one, scanning module 250 contains a signature matching at least the first three bytes of the data under consideration and proceeds with a binary search to determine whether the target bytes match one of its virus signatures. Thus, a full binary search is performed on only a small subset of potential target bytes. When the binary search matches these target bytes to a virus signature, scanning engine 250 terminates scanning of the target file, and PAM 200 indicates the identity of the detected polymorphic virus to a program designed to deactivate the virus. Deactivation programs are well known and are not discussed in greater detail here.

Figure 4A:
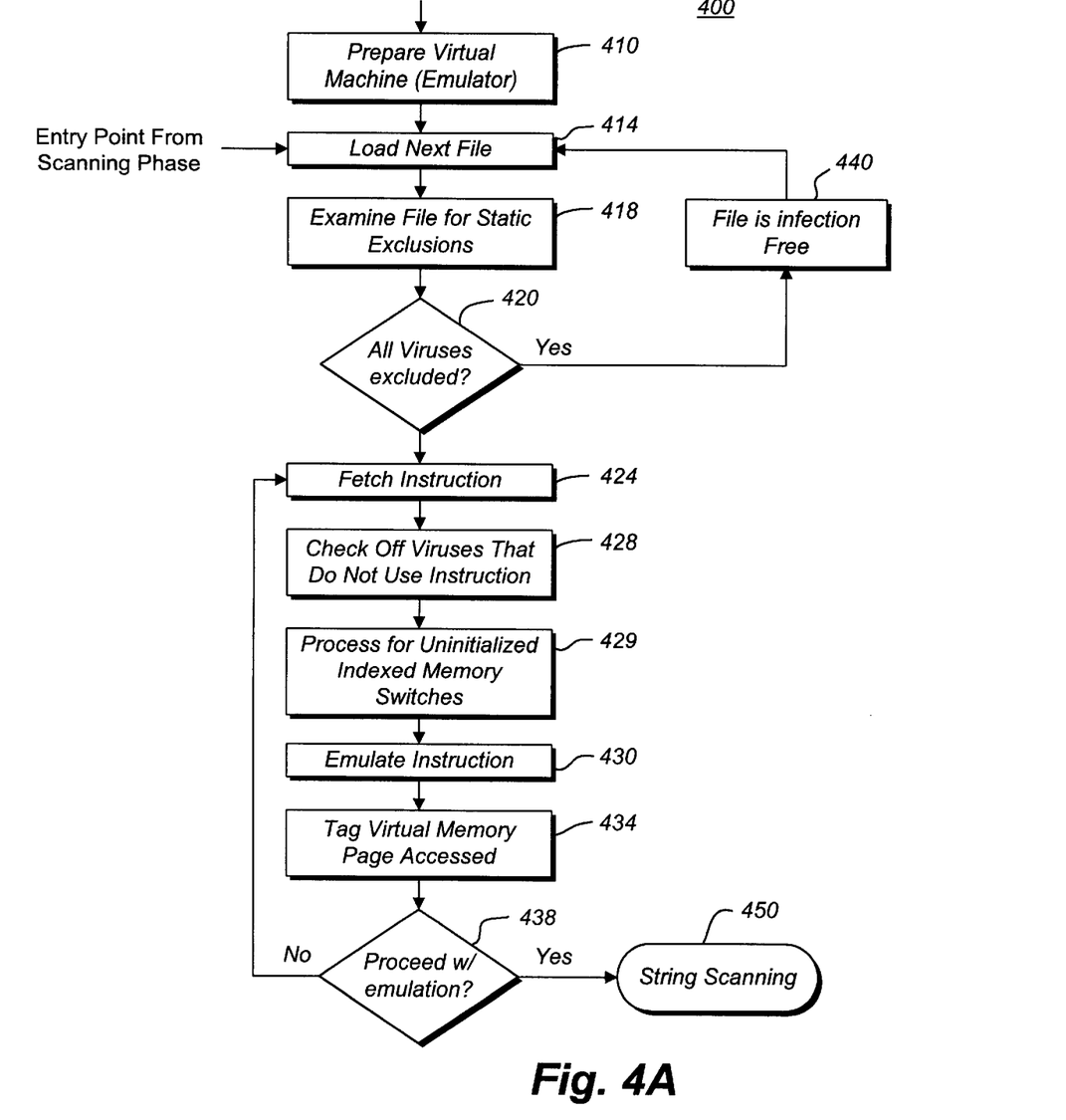
FIG. 4A is a flowchart of the emulation method (400) implemented by an emulation control module (220) in accordance with the present invention.

Referring now to FIG. 4A, there is shown a flow chart of static and dynamic exclusion phases of a polymorphic virus detection method 400 implemented by PAM 200. Method 400 begins by initializing 410 a virtual machine for emulating files in isolation from the host computer and loading 414 a target file for analysis. Analysis of the target file begins with a static exclusion phase, in which the target file is examined 418 for features that exclude certain known viruses from further consideration (static exclusions). If all known viruses have been excluded 420 at step 418, the target file is deemed infection-free 440 and the next target file is loaded 414 for emulation. If all known viruses are not excluded 420, method 400 enters the emulation phase.

During the emulation phase, instructions are fetched 424 from the target file and compared 428 with instruction/interrupt usage profiles 224 of known polymorphic viruses 150. For each polymorphic virus 150 that does not implement the fetched instruction, a corresponding flag in table 228 is reset.

Viruses typically use indexed memory writes for writing to memory. Indexed memory writes use an index register that defines the memory location that is to be written. Viruses typically initialize the index register before a write in order to have the write occur to a known memory location. Otherwise, the viability of the virus is reduced.

On the other hand, because of the random nature of the data and the nature of the instruction set of the processor running such instruction set (e.g., the 80×86 instruction set), emulated data files may include data that may appear as an indexed memory write op code if the data is interpretted as instructions in a debugger or emulator. As noted above, an indexed memory write uses an index register to define the memory location being written. (It should be noted that memory reads are less problematic because they are not destructive. In fact many viruses read randomly from memory.) When interpreted as a series of instructions, a data file typically includes one or more indexed memory write instructions. However, it is rare that such indexed memory write instructions are preceded by an initialization or modification of the referenced index register. Therefore, when the data file is interpreted as the series of instructions, the "program" usually performs random indexed memory writes. This is because of several aspects of the 80×86 instruction set.

If the fetched instruction is an indexed memory write, the method 400 executes a procedure 429 (described below in conjunction with FIG. 5) to determine whether the behavior of the program being emulated is more likely an executable or a data file, and whether the fetched instruction is not really an instruction but is actually data in a data file.

Following the procedure 429, the fetched instruction is then emulated 430 and any pages in virtual memory affected by the instruction are tagged 434. Affected pages include pages of virtual memory from which the instruction is fetched 424 as well as any pages in virtual memory that are modified when the instruction is emulated 430.

In the disclosed embodiment of the invention, the scanning phase 450 is entered if flags have been reset for all polymorphic viruses 150 in table 228 or if a preselected number of instructions have been emulated. In addition, the scanning phase 450 may be entered periodically, prior to the occurrence of either of these conditions, to attempt to identify a virus that has been partially decrypted. This periodic scanning approach is discussed below in conjunction with the scanning phase 450.

If method 400 determines 438 that none of the above conditions for entering the scanning phase 450 have occurred, the next instruction of the target file is fetched 424 for analysis. Eventually, either all polymorphic viruses 150 have been flagged 428 or the preselected number of instructions have been emulated 430, and method 400 enters the scanning phase 450. In the preferred embodiment of the invention, the preselected number of instruction is 1.5 million. This allows emulation of sufficient instructions to decrypt a substantial part of static virus body 160, even if it is not fully decrypted.

Figure 4B:
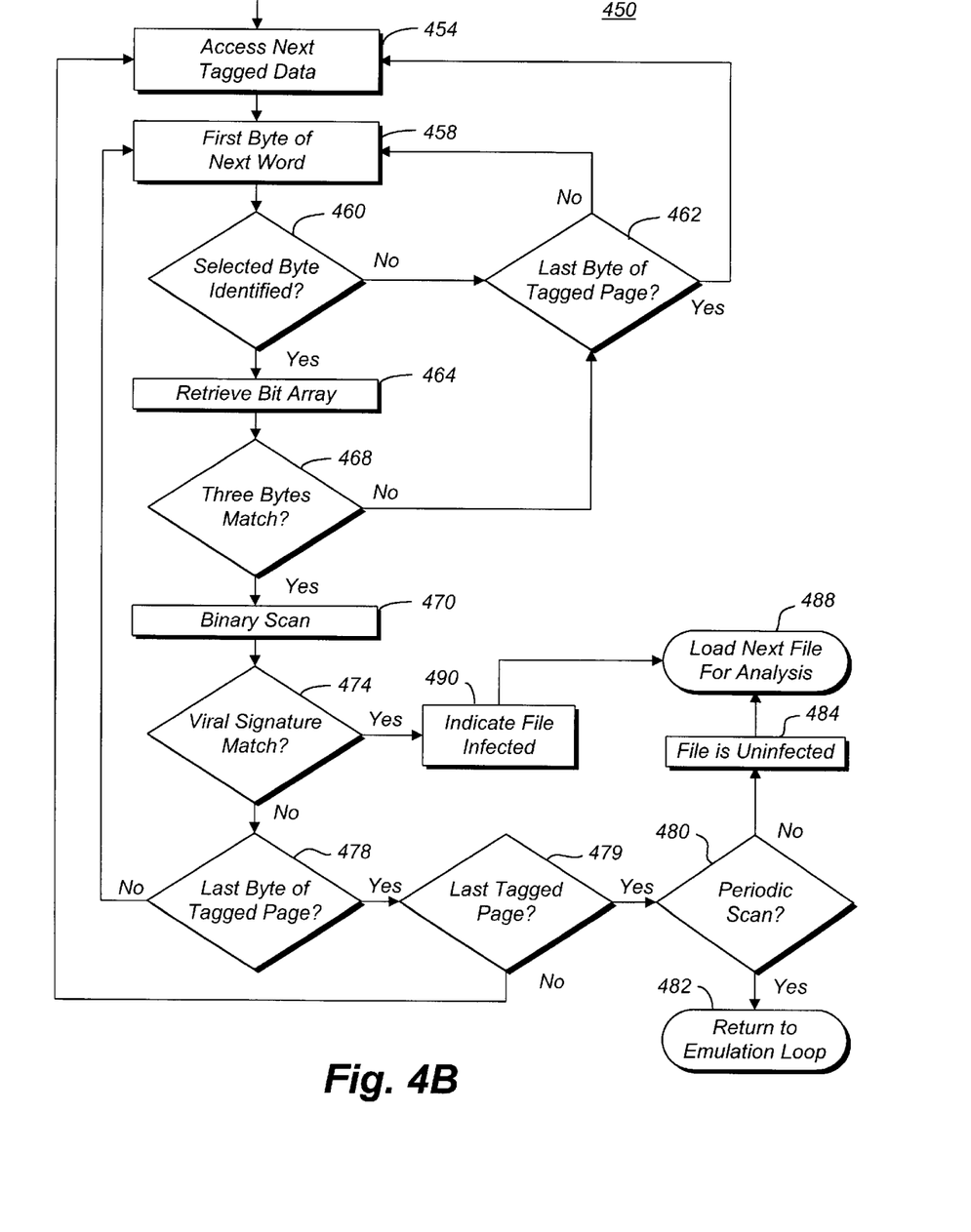
FIG. 4B is a flowchart of the scanning process (450) implemented by a scanning module (250) in accordance with the present invention.

Referring now to FIG. 4B, there is shown a flow chart of the scanning phase 450 of method 400. Page locations tagged 434 during the emulation phase are accessed 454 and scanned 458 byte at a time to determine 460 whether each scanned byte is a selected byte. If not, the next byte is scanned 458 and tested 460 until it is determined 462 that no more bytes remain on the current tagged page. When the last byte of the tagged page is reached 462, the next tagged page is accessed 454, and the process is repeated with each byte of the new tagged page.

When a selected byte is identified 460, the corresponding bit array is retrieved 464 to determine 468 whether the selected byte and two following bytes of the word are consistent with any of the viral signatures. If no match is possible, scanning process 450 branches to step 462. If a match is possible 468, process 450 begins a binary scan 470 to determine whether the full word actually matches 474 a viral signature. If a match is detected 474, process 450 indicates that the file is infected and proceeds to load 488 the next file for analysis. At this point, another module may be activated to eliminate the detected virus from the infected file.

If no match is detected 474, scanning continues with the first byte of the next word, unless it is determined 478 that the scanned byte is the last byte the tagged page. If the scanned byte is the last byte, then scanning continues with the first byte of the next tagged page, unless it is determined 479 that the scanned page is the last tagged page. When scanning of all tagged pages is completed without a match, the next step depends on which condition at step 438 of the emulation phase initiated scanning process 450. If the just completed scan was one initiated periodically 480 during decryption in the emulation phase, process 450 returns control 482 to the emulation process 400 in order to continue decrypting the target file. On the other hand, if the emulation phase was terminated 438 by either exclusion of all known polymorphic viruses 150 or emulation of 1.5 million instructions, no further emulation of the current target file is necessary. The target file is deemed uninfected 484 and the next target file is loaded 488 for analysis.

Figure 5:
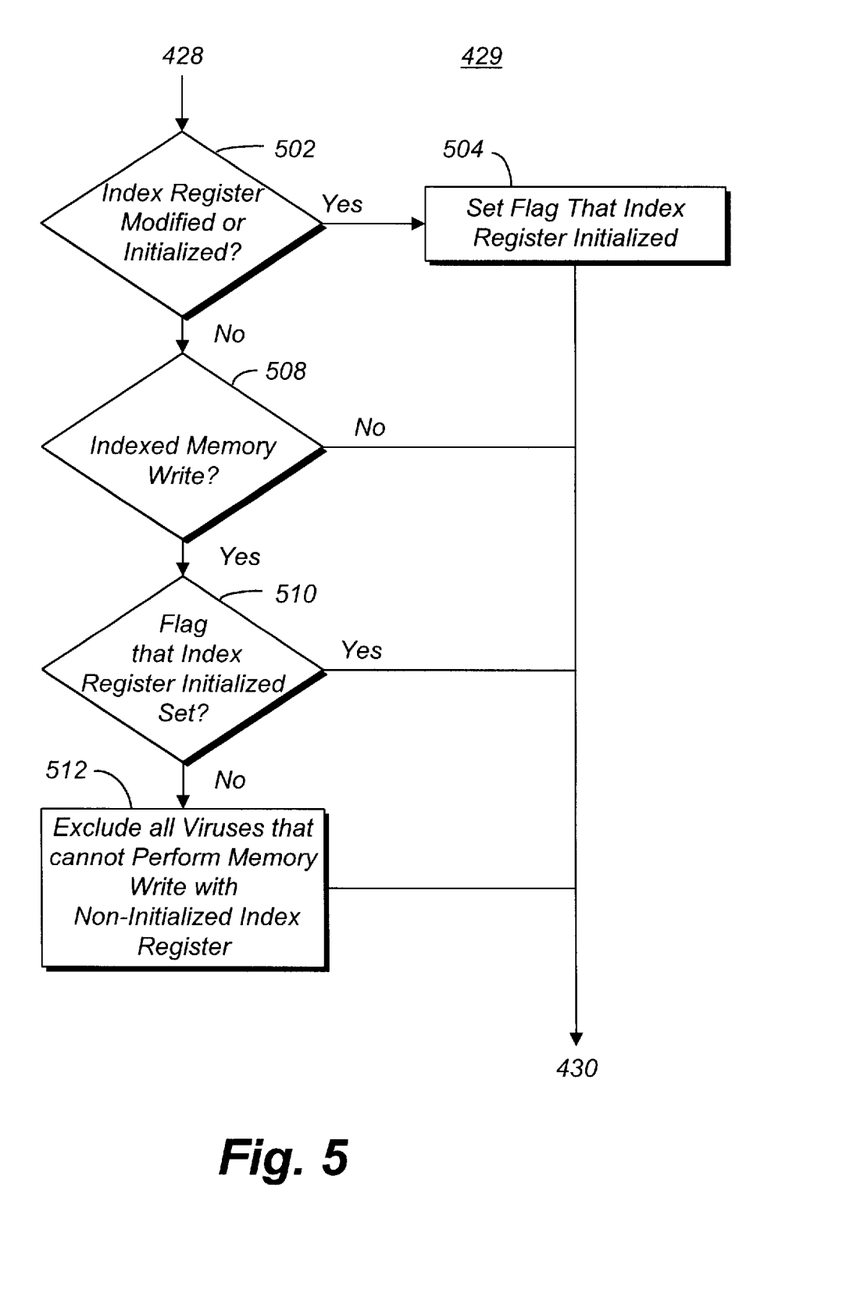
FIG. 5 is a flowchart of the processing (429) of an indexed memory write instruction for the emulation control module (220) in accordance with the present invention.

Referring now to FIG. 5, there is shown a flowchart of the processing 429 to detect and utilize non-initialized indexed writes. The process 429 determines 502 whether an index register is being modified or initialized during an emulation, and, if it is, sets 504 a flag for the index register. The process 429 also determines 508 whether an instruction is for an indexed memory write, and determines 510 whether the corresponding index register has been initialized or modified. If the register has been initialized or modified as indicated by the corresponding flag, the process 429 treats the instruction as part of a program (or virus) and emulates the instruction. Otherwise, the process 429 excludes 512 viruses incapable of random memory writes before emulating 430 the instruction.

As noted above, the process 429 is executed if the instruction uses an index register. The process 429 determines 502 whether the index register is being modified or initialized. The process 429 sets 504 a flag corresponding to the index register that is being initialized or modified to indicate that the index register is initialized or modified, and thus if an indirect memory write later uses this index register, the instruction is most likely from a virus or a program. The process 429 returns to emulate 430 the instruction and tag 434 the virtual memory page accessed described above in conjunction with FIG. 4.

On the other hand, if the determination 502 is that the index register is not being modified or initialized, the process 429 determines 508 whether the instruction is an indexed memory write. If the instruction is not an indexed memory write, the instruction is a "normal" instruction and the process 429 returns to emulate 430 the instruction and tag 434 the virtual memory page accessed described above in conjunction with FIG. 4.

If the instruction is an indexed memory write, the process 429 determines 510 whether the flag is set for the index register used in the memory write. If the flag is set, the instruction most likely is an instruction from a virus or a program, because the index register has been initialized or modified before the current fetched instruction (which is an indirect memory write). The process 429 returns to emulate 430 the instruction and tag 434 the virtual memory page accessed described above in conjunction with FIG. 4. If the flag is not set, the instruction is most likely is from a data file, and not actually a logical instruction in a program or virus. The process 429 excludes 512 all viruses that cannot perform a memory write with a non-initialized index register. The process 429 returns to emulate 430 the instruction and tag 434 the virtual memory page accessed described above in conjunction with FIG. 4.

In order to test PAM system 200, instruction/interrupt profiles 224 were generated for the six mutation engines 162 (implemented in the indicated viruses) and twelve polymorphic viruses 150 listed in Table 1. Each mutation engine 162/polymorphic virus 150 was used to infect 200 files, and 100 of these infected files were executed, generating a sample of 100 different decryption loops for each mutation engine 162/polymorphic virus 150. The sample of decryption loops were then scanned, and the instructions/interrupts used by each mutation engine 162/polymorphic virus 150 were tallied to provide a corresponding instruction/interrupt profile 224 (FIG. 3). Instruction/interrupt profiles 224 generated by the 100 infected files were then employed by PAM 200 in scanning the remaining 100 infected files. PAM system 200 detected each mutation engine 162/polymorphic virus 150 in each of the 100 infected files.

| Mutation Engine (& Virus(es) Used) | Polymorphic Virus |
|---|---|
| Dark Angel Mutation Engine (DAME) Virus used: Lame | Bishop Virus |
| Dark Slayer Confusion Engine (DSCE) Virus used: Connie | Commander Bomber Virus |
| Dark Slayer Mutation Engine (DSME) Virus used: Connie | Everfire Virus |
| The Mutation Engine (MtE) Viruses used: Coffeshop, CryptLab, Fear, Groove, Insuf, Pogue, Questo, Sara, Shocker | IAMV Virus |
| SMEG Virus used: Queeg | K-Hate Virus |
| Trident Polymorphic Engine (TPE) Viruses used: Bosnia, Giraffe, YB | Mutagen Virus |
| | Natas Virus |
| | One-Half Virus |
| | Satan Bug Virus |
| | Tremor Virus |
| | Uniguay (10) Virus |
| | V2P6Z Virus |

Referring now to Table 2, there is shown a comparison of the detection statistics for PAM system 200 and four other shareware and commercial virus detection products. Each anti-virus program was run on the same 100 infected files examined by PAM system 200. A 'yes' entry for a virus indicates that the corresponding anti-virus program detected each of the instances of infection for the corresponding virus. Only an anti-virus scanner that detects all infections of a given virus can guarantee that a cleaned system will not become reinfected. As can be seen from the table, only the PAM system 200 detected every instance of every virus.

| Engine/Virus | McAfee SCAN 2.20 (CDPE-Based) | KAMI AVP 2.1 (CDPE-Based) | Command F-Prot 2.17 | Thunderbyte TBAV 6.34 (CDPE-Based) | PAM |
|---|---|---|---|---|---|
| DAME | no | yes | no | yes | yes |
| DSME | no | yes | yes | yes | yes |
| MtE | no | yes | yes | yes | yes |
| Mutagen | no | yes | yes | yes | yes |
| SMEG | no | yes | yes | yes | yes |
| TPE 1.4 | no | yes | no | yes | yes |
| Cmdr. Bomber | no | yes | no | no | yes |
| Everfire | no | yes | yes | yes | yes |
| IAMV | yes | yes | yes | yes | yes |
| K-Hate | no | yes | no | no | yes |
| Natas | yes | yes | yes | yes | yes |
| One Half | no | yes | no | yes | yes |
| Bishop | no | no | yes | yes | yes |

-continued

| Engine/Virus | McAfee SCAN 2.20 (CDPE-Based) | KAMI AVP 2.1 (CDPE-Based) | Command F-Prot 2.17 | Thunderbyte TBAV 6.34 (CDPE-Based) | PAM |
|---|---|---|---|---|---|
| Satan Bug | yes | yes | yes | yes | yes |
| Tremor | yes | yes | yes | yes | yes |
| Uruguay (10) | no | no | no | no | yes |
| DSCE | not tested | not tested | not tested | not tested | yes |
| VsP6Z | yes | yes | yes | yes | yes |

Thus, a system and method have been provided for detecting polymorphic viruses without recourse to the booster and stopper heuristics employed by available CDPE-based systems. Systems and methods in accordance with the present invention employ a static phase in which the gross features of a file are first examined to determine whether infection by some polymorphic viruses can be excluded at the outset. A subsequent emulation phase looks for a polymorphic detection loop in the file by comparing each instruction generated during file emulation with instruction/interrupt usage profiles for known polymorphic virus/mutation engine. Virtual memory pages executed or modified during emulation are tested during a scanning phase for virus signatures.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A computer-implemented method for detecting computer viruses in a computer file, the method comprising:

determining whether an instruction is a register-indirect memory write, which writes to a memory address specified by the contents of a register;

determining whether the register is uninitialized if the instruction is a register-indirect memory write; and excluding from consideration those viruses that cannot perform register-indirect memory writes if the register is uninitialized.

2. The computer-implemented method of claim 1, further comprising:

setting a flag if the register is initialized.

3. The computer-implemented method of claim 2, wherein determining whether the register is uninitialized comprises determining whether the flag is set.

4. The computer-implemented method of claim 1, wherein the register is an index register.

5. The computer-implemented method of claim 1, wherein the register is a base register.

6. A system for detecting computer viruses in a computer file, the system comprising:

a register;

an emulation control module for determining whether an instruction is a register indirect memory write, which writes to a memory address specified by the contents of a register; determining whether the register is uninitialized if the instruction is a register-indirect memory write; and excluding from consideration those viruses that cannot perform register-indirect memory writes if the register is uninitialized; and a CPU emulator for simulating instructions of the computer file.

7. A computer program product comprising a computer-usable medium having a computer-readable code embodied therein for detecting computer viruses in a computer file, comprising:

computer-readable program code devices configures to determine whether an instruction is a register-indirect memory write, which writes to a memory address specified by the contents of a register;

computer-readable program code devices configured to determine whether the register is uninitialized if the instruction is a register-indirect memory write; and computer-readable program code devices configured to exclude from consideration those viruses that cannot perform register-indirect memory writes if the register is uninitialized.

* * * * *